US010252370B2

(12) United States Patent
Fukumoto et al.

(10) Patent No.: US 10,252,370 B2
(45) Date of Patent: Apr. 9, 2019

(54) RESISTANCE SPOT WELDING METHOD AND WELDED STRUCTURE (71) Applicant: NIPPON STEEL & SUMITOMO METAL CORPORATION, Tokyo (JP)

(72) Inventors: Manabu Fukumoto, Tokyo (JP); Hitomi Nishibata, Tokyo (JP); Masanori Yasuyama, Tokyo (JP)

(73) Assignee: NIPPON STEEL & SUMITOMO METAL CORPORTION, Tokyo (JP)

(*) Notice: Subject to any disclaimer, the term of this patent is extended or adjusted under 35 U.S.C. 154(b) by 202 days.

(21) Appl. No.: 14/917,287

(22) PCT Filed: Sep. 11, 2014

(86) PCT No.: PCT/JP2014/074043
§ 371 (c)(1),
(2) Date: Mar. 8, 2016

(87) PCT Pub. No.: WO2015/037652
PCT Pub. Date: Mar. 19, 2015

(65) Prior Publication Data
US 2016/0207139 A1 Jul. 21, 2016

(30) Foreign Application Priority Data

Sep. 12, 2013 (JP) ................................ 2013-189263

(51) Int. Cl.
B23K 11/10 (2006.01)
B23K 11/11 (2006.01)
(Continued)

(52) U.S. Cl.
CPC ............. *B23K 11/115* (2013.01); *B23K 11/16* (2013.01); *B23K 11/34* (2013.01);
(Continued)

(58) Field of Classification Search
CPC ....... B23K 11/115; B23K 11/16; B23K 11/34; B23K 2201/006; B23K 2201/18; B23K 2203/04
(Continued)

(56) References Cited

U.S. PATENT DOCUMENTS 1,933,484 A * 10/1933 Ragsdale ............... B23K 11/115
109/85
5,302,797 A * 4/1994 Yasuyama ............. B23K 11/115
219/118

(Continued)

FOREIGN PATENT DOCUMENTS

CN 102198562 9/2011
CN 103180082 6/2013
(Continued)

OTHER PUBLICATIONS

JP0999379A_translation.pdf.*

Primary Examiner — Dana Ross
Assistant Examiner — Ket D Dang
(74) Attorney, Agent, or Firm — Clark & Brody (57) ABSTRACT An overlapped body 10 includes at least three steel plates 1a, 1b and 1c and in which at least one steel plate interface 2a has a contact resistance different from the contact resistance of another steel plate interface 2b. A molten pool is formed at the steel plate interfaces so as to join the steel plates 1a, 1b and 1c, and an energization point 5 is formed at the steel plate interface 2b having the largest contact resistance. Initial spot welding is performed under a condition in which a branch current is generated in the energization point 5 so as to form the molten pool. By doing so, it makes it difficult to generate the expulsion and surface flash at the steel plate interface where resistive heating is large and form the (Continued)

molten pool having a sufficiently large size at the steel plate interface where resistive heating is small.

4 Claims, 3 Drawing Sheets

(51) Int. Cl.
  *B23K 11/16* (2006.01)
  *B23K 11/34* (2006.01)
  *B23K 101/00* (2006.01)
  *B23K 101/18* (2006.01)
  *B23K 103/04* (2006.01)
(52) U.S. Cl.
  CPC .... *B23K 2101/006* (2018.08); *B23K 2101/18* (2018.08); *B23K 2103/04* (2018.08)
(58) Field of Classification Search
  USPC ..... 219/91.2, 78.16, 86.1, 91.23, 92, 93, 94, 219/118, 157, 117.1, 78.01, 91.22
  See application file for complete search history.

(56) References Cited

U.S. PATENT DOCUMENTS

| | | | | |
|---|---|---|---|---|
| 2008/0241572 | A1* | 10/2008 | Miyamoto | B23K 11/115 428/600 |
| 2009/0302010 | A1* | 12/2009 | Goto | B23K 11/115 219/117.1 |
| 2010/0044349 | A1* | 2/2010 | Yoo | B23K 11/185 219/118 |
| 2011/0233173 | A1* | 9/2011 | Kaneko | B23K 11/002 219/83 |
| 2012/0055910 | A1* | 3/2012 | Sakai | B23K 11/115 219/127 |
| 2012/0074113 | A1* | 3/2012 | Hasegawa | B23K 11/115 219/127 |
| 2012/0241416 | A1* | 9/2012 | Sakamoto | B23K 11/115 219/91.2 |
| 2012/0248086 | A1* | 10/2012 | Watanabe | B23K 11/115 219/162 |
| 2013/0153544 | A1* | 6/2013 | Goto | B23K 11/115 219/117.1 |

FOREIGN PATENT DOCUMENTS

| | | | |
|---|---|---|---|
| JP | 59-223180 | 12/1984 | |
| JP | 09-099379 | 4/1997 | |
| JP | 0999379 A * | 4/1997 | ............ B23K 11/11 |
| JP | 10249537 A * | 9/1998 | ............ B23K 11/11 |
| JP | 2000-141054 | 5/2000 | |
| JP | 2003-251469 | 9/2003 | |
| JP | 2005-262259 | 9/2005 | |
| JP | 2009-279597 | 12/2009 | |
| JP | 2009-291827 | 12/2009 | |
| JP | 2011-194453 | 10/2011 | |
| JP | 2012-011398 | 1/2012 | |
| JP | 2012-055896 | 3/2012 | |
| JP | 2012-076125 | 4/2012 | |
| JP | 2012-187616 | 10/2012 | |
| JP | 2013-035063 | 2/2013 | |

* cited by examiner

RESISTANCE SPOT WELDING METHOD AND WELDED STRUCTURE

TECHNICAL FIELD

The present invention relates to a resistance spot welding method suitable to join three or more steel plates, and a welded structure obtained by the resistance spot welding method.

BACKGROUND ART

In recent years, in a welding step of welding automotive components, a resistance spot welding method is widely used in which a plurality of steel plates are overlapped and then sandwiched by a pair of electrodes, and the overlapped body is then energized while being pressed so as to form a molten pool (usually called "nugget") at the steel plate interface and thereby to join the steel plates.

Figure 4:
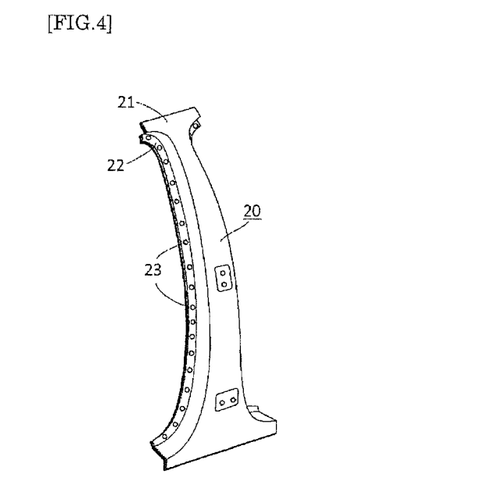
FIG. 4 is a diagram showing the structural members of a door opening portion of an automobile.

For example, a door opening portion of an automobile includes, as structural members, a pillar and a roof rail. A pillar 20 includes an overlapped body 21 in which, for example, three steel plates respectively constituting an outer steel plate, a reinforced steel plate and an inner steel plate, are overlapped (hereinafter referred to as "steel plates" including the overlapped body). As shown in FIG. 4, the overlapped body 21 is joined by forming weld portions 23 at a predetermined interval by spot welding in a flange 22 of the overlapped body 21.

As the overlapped body described above, various combinations (hereinafter referred to as "plate combinations") can be conceived by selecting the number of steel plates and the material of the steel plates, but for some plate combinations, it may be difficult to find appropriate welding conditions for obtaining a sound nugget (hereinafter, such combinations will be referred to as "difficult-to-weld plate combinations"). As used herein, "sound nugget" refers to a nugget having a sufficiently large molten pool and exhibiting a sufficient joint strength in a tensile test or the like using a joined body (joint). As the size of a weld portion, for example, generally, a value of $4\sqrt{t}$ or more (where t is the thickness (mm) of the thinner one of the steel plates forming the steel plate interface) is used as the reference. A typical example of a difficult-to-weld plate combination is an overlapped configuration of three steel plates including a thin steel plate, a thick steel plate 1 and a thick steel plate 2 as used in the door opening portion of the body of an automobile described above. Generally, for these members, a mild steel plate having a thickness of 1.0 mm or less is used as the thin steel plate, and high-tensile strength steel plates having a thickness of 1.2 mm or more and a tensile strength of 340 MPa or more are used as the thick steel plate 1 and the thick steel plate 2.

The reason that it is difficult to find appropriate welding conditions for obtaining a sound nugget for the difficult-to-weld plate combination will be described below.

Specifically, if the amount of energization is too large with respect to the contact electric resistance (hereinafter referred to simply as "contact resistance") at an interface between steel plates that are in contact with each other, erosion called expulsion and surface flash (also called spatter, splash or the like) caused as a result of the steel plate interface being overheated due to resistive heating is likely to occur. If, on the other hand, the amount of energization is too small, the amount of resistive heating at the steel plate interface is reduced, and thus the molten pool cannot be made sufficiently large. In the case of, for example, the overlapped body composed of three steel plates, there are two steel plate interfaces, but the amount of resistive heating at a steel plate interface between the thin steel plate and the thick steel plate 1 is relatively smaller than the amount of resistive heating at a steel plate interface between the thick steel plate 1 and the thick steel plate 2. For this reason, if welding is performed at one of the steel plate interfaces by using the amount of energization that is preferable to obtain a sound nugget without causing the expulsion and surface flash, the amount of resistive heating at the other steel plate interface will inevitably be too large or small. As a result, the expulsion and surface flash will be generated at the interface between the thick steel plate 1 and the thick steel plate 2, or the nugget formed at the interface between the thin steel plate and the thick steel plate 1 will be insufficient. For this reason, generally, the amount of energization is set to be relatively high although the expulsion and surface flash occurs at the interface between the thick steel plate 1 and the thick steel plate 2.

Patent Document 1 discloses a method for making a spot welded joint including a nugget having a required size without causing the expulsion and surface flash in a difficult-to-weld plate combination as described above. According to the invention disclosed in Patent Document 1, a two-stage welding process including a first stage welding process and a second stage welding process is performed, wherein the second stage welding process is performed with a higher welding pressure, a lower current or the same current, and a longer or the same energization time with respect to the first stage welding process.

Other than the above, Patent Document 2 discloses a method for performing welding in a difficult-to-weld plate combination, wherein the welding pressure of an electrode chip on a workpiece is changed between the front surface and the back surface. Patent Document 3 discloses a method in which the cooling effect of cooling water that circulates through an electrode is alleviated by interposing a welding aid between the thin steel plate and the electrode.

In a welding step of welding automotive components or the like with the use of resistance spot welding, generally, a plurality of welding spots are provided consecutively at locations required from the design point of view. Accordingly, when resistance welding is performed at a given location, if there already is a welding spot near the location (hereinafter referred to as "existing welding spot"), a branch current that flows through the existing welding spot as an energization path is generated. Another case is also conceived in which, an energization path is formed at a location other than the existing welding spot and a branch current is generated depending on the geometric shape of members and the arrangement of space with another member. As described above, if the welding current is branched at the time of welding, formation of the molten pool is delayed and thus a sound nugget cannot be obtained. The branch current is also called reactive current, and various investigations have been made on the method for limiting the influence thereof.

For example, Patent Document 4 discloses an invention in which a reactive current is calculated and a current that is increased by an amount corresponding to the calculated reactive current is set as a welding current. Patent Document 5 discloses a method for obtaining a sound nugget by forming a slit so as to reduce the influence of reactive current. Patent Documents 6 and 7 disclose inventions in which an auxiliary electrode is provided near an electrode for the purpose of adjusting the branched state of the welding current so as to give a proper heating condition near the welding spot.

LIST OF PRIOR ART DOCUMENTS

Patent Documents

Patent Document 1: JP 2005-262259A
Patent Document 2: JP 2003-251469A
Patent Document 3: JP 2009-291827A
Patent Document 4: JP H09-99379A
Patent Document 5: JP 2009-279597A
Patent Document 6: JP 2012-11398A
Patent Document 7: JP 2012-55896A

DISCLOSURE OF THE INVENTION

Problems to be Solved by the Invention

The invention of Patent Document 1 is problematic in that not only the configuration of the welding apparatus and the welding conditions are complex, but also due to the welding pressure used in the first stage welding process being low, if there is a certain amount of gap at each interface between overlapped steel plates, it may not be able to bring all of the interfaces of overlapped steel plates into contact by the welding pressure of the first stage welding process, in which case the energization path is not formed and welding cannot be performed at all. For this reason, there is a need for a method which welding can be performed on a difficult-to-weld plate combination irrespective of the presence or absence of a gap between steel plates.

The invention of Patent Document 2 requires special control to be performed because it is necessary to change the welding pressure of each electrode based on the contact resistance at each steel plate interface. The invention of Patent Document 3 can alleviate the cooling effect of electrodes, but does not overcome the difficulties of welding caused by the difference in contact resistance between steel plate interfaces.

Patent Documents 4 and 5 merely disclose methods for cancelling the reactive current basically for a plate combination composed of two plates, and contain no disclosure regarding a method with which welding can be performed on a difficult-to-weld plate combination.

Patent Documents 6 and 7 both disclose that the inventions thereof are advantageous in that as a result of providing an auxiliary electrode near an electrode, a branch current is generated, and thus the resistive heating can be increased in the steel plate where the auxiliary electrode is provided, and the molten pool can be made large.

However, the inventions of the above patent documents require an auxiliary electrode to be provided near an electrode, which makes the operation mechanism of the welder complex and the size of the electrode becomes larger than ordinary electrodes due to the presence of the auxiliary electrode, which make it difficult to perform welding on, for example, a narrow area such as a flange. In particular, these methods are intended to increase the resistive heating of the steel plate where the auxiliary electrode is provided, and thus a problem arises in that when spot welding is performed on, for example, an overlapped body that is composed of three or more steel plates and in which at least one steel plate interface has a contact resistance different from the contact resistance of another steel plate interface, the molten pool cannot grow as large as intended unless a steel plate interface having a small contact resistance is provided near the auxiliary electrode. For this reason, there is a need for a technique for uniforming the amounts of heat generation at a plurality of steel plate interfaces having different contact resistances by using only a pair of opposing electrodes as with regular resistance spot welding, without using an auxiliary electrode as described above.

The present invention has been made to solve the problems described above, and it is an object of the present invention to provide a resistance spot welding method with which it is possible to form molten pools having a sufficiently large size in an overlapped body that is composed of three or more steel plates and in which at least one steel plate interface has a contact resistance different from that of another steel plate interface, while suppressing the generation of the expulsion and surface flash, and a welded structure obtained by the resistance spot welding method.

Means for Solving the Problems

Figure 1:
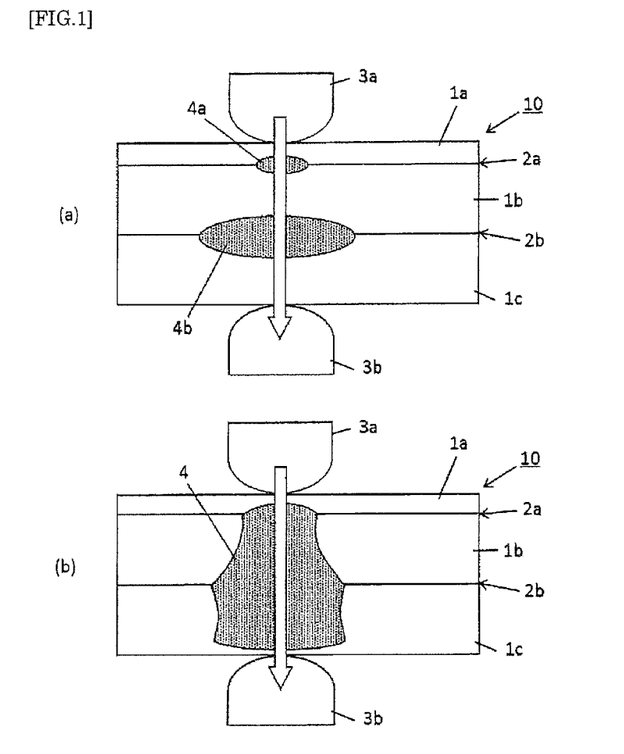
FIG. 1 is a conceptual diagram showing, as an example, a resistance spot welding method according to a conventional technique.

As shown in FIG. 1(a), when spot welding is performed on an overlapped body 10 that is composed of at least three steel plates 1a, 1b and 1c and in which at least one steel plate interface 2a has a contact resistance different from the contact resistance of another steel plate interface 2b so as to form molten pools 4a and 4b at the steel plate interfaces 2a and 2b by energizing (see the solid white arrow) the overlapped body 10 while sandwiching and pressing the overlapped body 10 by a pair of electrodes 3a and 3b, if the steel plate 1a is a mild steel plate and the steel plates 1b and 1c are high-tensile strength steel plates, the steel plate interface 2a has a small contact resistance, and the steel plate interface 2b has a large contact resistance. At this time, the amount of resistive heating is larger at the steel plate interface 2b than at the steel plate interface 2a, and thus the molten pool 4b at the steel plate interface 2b is formed faster than the molten pool 4a formed at the steel plate interface 2a. Thus, as shown in FIG. 1(b), if energization is performed based on the heated state of the steel plate interface 2b where resistive heating is large, it is difficult to form a molten pool having a sufficiently large size at the steel plate interface 2a where resistive heating is small. If, on the other hand, the steel plate interface 2a where resistive heating is small is sufficiently heated, the steel plate interface 2b where resistive heating is large is overheated, which causes a problem in that the expulsion and surface flash is likely to occur at the steel plate interface.

To address this, the present inventors conducted intensive studies and accomplished the present invention in which unlike a conventional technique that generates a branch current at the outermost surface of the steel plates, a portion having a small energization resistance (hereinafter referred to as "energization point") is formed at a steel plate interface having a large contact resistance so as to generate a branch current at the steel plate interface, whereby it is possible to make it difficult to generate the expulsion and surface flash at the steel plate interface where resistive heating is large and easily form a molten pool having a sufficiently large size at the steel plate interface where resistive heating is small.

The present invention is intended to provide a resistance spot welding method as described below and a welded structure obtained by the resistance spot welding method.

(1) A resistance spot welding method in which in an overlapped body that includes three or more steel plates and in which at least one steel plate interface has a contact resistance different from a contact resistance of another steel plate interface, a molten pool is formed at the steel plate interfaces so as to join the steel plates, the method including: a preliminary welding step of forming an energization point at a steel plate interface having the largest contact resistance; and a main welding step of performing initial spot welding under a condition in which a branch current is generated in the energization point.

(2) The resistance spot welding method according to (1) described above, in which in the main welding step, the initial spot welding is performed such that the molten pool is formed at a position at a horizontal distance of 30 mm or less from the energization point.

(3) The resistance spot welding method according to (1) or (2) described above, in which in the preliminary welding step, the energization point is formed at the steel plate interface having the largest contact resistance by energizing the overlapped body while sandwiching and pressing the overlapped body by a pair of electrodes.

(4) The resistance spot welding method according to any one of (1) to (3) described above, in which in the main welding step, spot welding is further performed repeatedly under a condition in which a branch current is generated in the energization point or the molten pool.

(5) The resistance spot welding method according to any one of (1) to (4) described above, in which in the main welding step, spot welding is further performed repeatedly such that a molten pool is formed at a position at a horizontal distance of 30 mm or less from the energization point or the molten pool.

(6) The resistance spot welding method according to any one of (1) to (5) described above, in which the overlapped body consists of one mild steel plate and two high-tensile strength steel plates.

(7) A welded structure obtained by a method according to any one of (1) to (6) described above.

Advantageous Effects of the Invention

According to the present invention, even when spot welding is performed on an overlapped body that is composed of three or more steel plates and in which at least one steel plate interface has a contact resistance different from the contact resistance of another steel plate interface, it is possible to make it difficult to generate the expulsion and surface flash at a steel plate interface where resistive heating is large and form a molten pool having a sufficiently large size at a steel plate interface where resistive heating is small. In addition, if the overlapped body is, for example, a long automotive structural member, with the present invention in which weld portions are consecutively formed in the lengthwise direction, it is possible to obtain a high-strength structural member.

MODE FOR CARRYING OUT THE INVENTION

Figure 2:
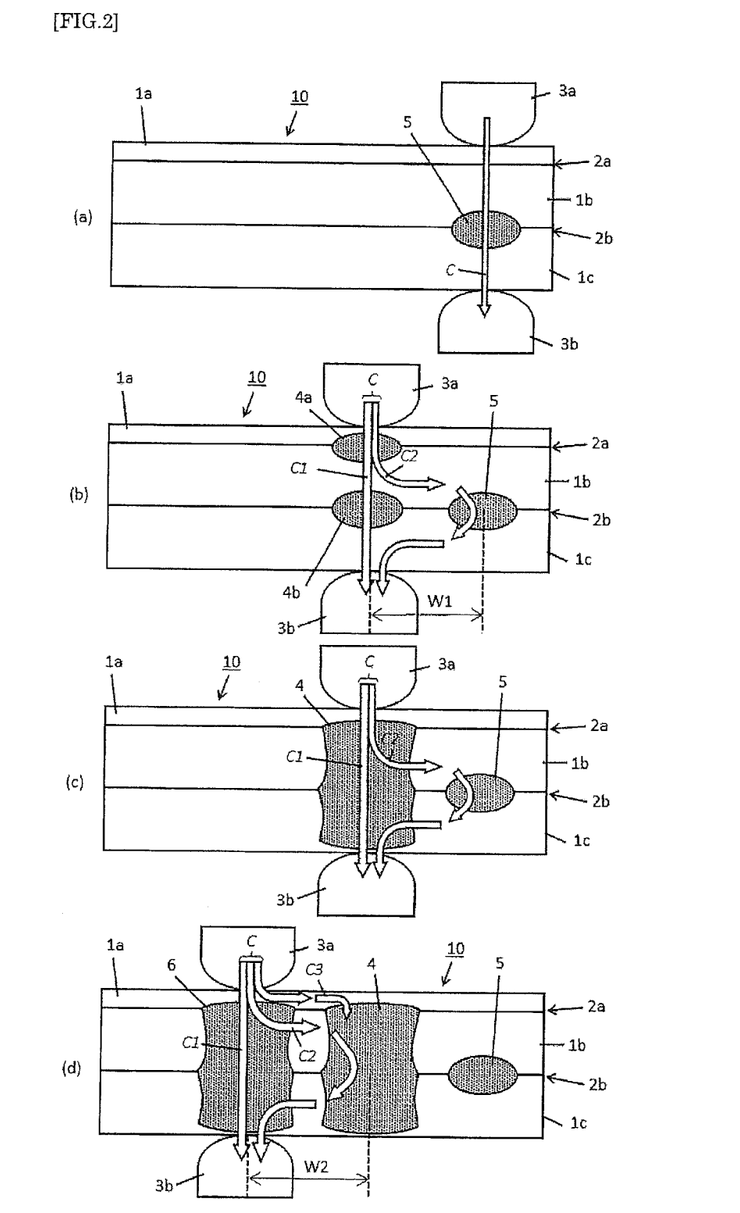
FIG. 2 is a conceptual diagram showing, as an example, a resistance spot welding method according to the present invention.

As shown in FIG. 2(a), a resistance spot welding method according to the present invention is a resistance spot welding method in which an overlapped body 10 that includes, for example, at least three steel plates 1a, 1b and 1c and in which at least one steel plate interface 2a has a contact resistance different from the contact resistance of another steel plate interface 2b is energized (see a solid white arrow C) while being sandwiched and pressed by a pair of dome-shaped electrodes 3a and 3b so as to form molten pools at the steel plate interfaces and thereby to join the steel plates 1a, 1b and 1c. And, it is important to, in a preliminary step, form an energization point 5 at the steel plate interface 2b having the highest contact resistance. Hereinafter, an example will be described in which the energization point 5 has a circular or generally circular shape on the steel plate interface. Also, the shape of the contact region between a steel plate against which the tip of a dome-shaped electrode is pressed and the electrode is substantially circular or generally circular.

In a main welding step, when initial spot welding is performed under a condition in which a branch current is generated in the energization point 5, as shown in FIG. 2(b), a welding current C is branched (C2=C−C1), and thus it is possible to delay the formation of the molten pool 4b at the steel plate interface 2b where resistive heating is large without impeding the formation of the molten pool 4a at the steel plate interface 2a where resistive heating is small. Since the present invention has a configuration as described above, as shown in FIG. 2(c), it is possible to form a sufficiently large molten pool 4 at the steel plate interface 2a where resistive heating is small and the steel plate interface 2b where resistive heating is large.

It is preferable that the initial spot welding is pertained such that a molten pool is formed at a position at a horizontal distance W1 of 30 mm or less from the energization point 5 (the distance between the center of the energization point and the center of the weld portion). In particular, when it is particularly difficult to obtain heat generation in the steel plate of the smallest thickness such as when the ratio between the smallest thickness in the thicknesses of a plurality of steel plates overlapped and the total thickness of all of the steel plates (hereinafter referred to as "thickness ratio") is large, the horizontal distance W1 from the energization point 5 is preferably set to be 25 mm or less, more preferably 20 mm or less, and even more preferably 15 mm or less. However, if the distance is too short, the amount of branch current will be too large, causing a problem in that the amount of resistive heating at the steel plate interface 2b where resistive heating is large will be smaller than that at the steel plate interface 2a. Accordingly, the distance is preferably set to 10 mm or more. The center of the energization point and the center of the weld portion refer to the center of the contact region of the steel plate surface pressed by the electrode.

In the example shown in FIG. 2, a description has been given by taking an overlapped body composed of three steel plates as an example, but the resistance spot welding method according to the present invention is applicable to an overlapped body that is composed of four or more steel plates and in which at least one steel plate interface has a contact resistance different from that of the other steel plate interfaces. This is because in the case of the overlapped body composed of four or more steel plates as well, the molten pools at the steel plate interfaces where resistive heating is large are more easily formed than the molten pools at the steel plate interface where resistive heating is small, and thus by providing energization points as described above at the steel plate interfaces having a large contact resistance, the formation of molten pools at the steel plate interfaces can be delayed.

The size of the energization point 5 may be smaller or larger than a circle having a diameter required for the molten pool 4 from the design point of view (for example, 4√t, where t is the thickness (mm) of the thinner one of the steel plates forming the steel plate interface). However, if the energization point 5 is too small, the influence of so-called "constriction resistance" will be large, and a branch current flowing through the energization point 4 may not be obtained sufficiently. Accordingly, the size of the energization point 5 is preferably a size corresponding to a circle having a diameter of 1 mm or more.

In the embodiment described above, a description has been given of an example of forming the energization point 5 at which the interface is fusion joined, but it is also possible to form an energization point at which the interface is not fused and is thus in a press contact state. In the case of forming the energization point in a press contact state, it is preferable that the size of a press contact portion between the steel plate 1b and the steel plate 1c (the portion serving as an energization point at the steel plate interface) is a size corresponding to a circle having a diameter of 1 mm or more. Furthermore, in the embodiment described above, an example has been described in which the shape of the weld portions and energization point at the steel plate interfaces is circular or generally circular, but the shape may be polygonal such as triangular or rectangular other than circular or generally circular as long as constriction resistance is not generated. At this time, the horizontal distance W1 and a horizontal distance W2 described later can be measured assuming the centroids of the weld portion and the energization point as the centers thereof.

In the example shown in FIG. 2, both preliminary welding and main welding may be performed in a state in which three steel plates are overlapped, but it is also possible to, for example, perform preliminary welding in a state in which two steel plates constituting a steel plate interface having the largest contact resistance are overlapped in advance, and thereafter having another steel plate overlapped to the two steel plates to perform main welding. From the viewpoint of production efficiency, it is preferable to use a method in which both preliminary welding and main welding are performed in a state in which three steel plates are overlapped.

In the case of welding four or more steel plates (or in other words, in the case where there are three or more steel plate interfaces) as well, both preliminary welding and main welding may be performed in a state in which all of the steel plates are overlapped, but it is also possible to form an energization point and a molten pool (it may be an energization point) in an overlapped body made of three steel plates by any one of the methods described above, and thereafter having another steel plate overlapped to the three steel plates to perform main welding. The same applies to an overlapped body in which five steel plates are overlapped. That is, in the case where N (where N≥3) steel plates are overlapped, or in other words, in the case where the number of steel plate interfaces is N−1, preliminary welding is performed N−2 times.

The resistance spot welding method according to the present invention is suitable to perform in welding on, in particular, an overlapped body composed of one mild steel plate and two high-tensile strength steel plates. Such a plate combination is widely used in automotive components as described above. In the case of the pillar shown in FIG. 4, a plate combination composed of a 0.5 to 0.8 mm mild steel plate (having a tensile strength of, for example, 270 MPa grade) as the outer steel plate, a 1.2 to 2.0 mm high-tensile strength steel plate having a tensile strength of 980 to 1500 MPa grade as the reinforced steel plate, and a 1.2 to 2.0 mm high-tensile strength steel having a tensile strength of 340 to 780 grade is used. As used herein, "mild steel plate" refers to a steel plate typically having a tensile strength of 270 MPa or more and less than 340 MPa, and can be, for example, JAC270D (galvannealed steel plate having a tensile strength of 270 MPa grade) or the like. "High-tensile strength steel plate" refers to a steel plate typically having a tensile strength of 340 MPa or more, and can be, for example, JSC590R, JSC980DP or the like.

At this time, the steel plate 1a in the diagram is a mild steel plate, the steel plates 1b and 1c are high-tensile strength steel plates, and the interface 2a between the mild the steel plate 1a and the high-tensile strength steel plate 1b is a steel plate interface having a small contact resistance, and the interface 2b between the high-tensile strength the steel plates 1b and 1c is a steel plate interface having a large contact resistance.

In a preliminary welding step, the energization point 5 can be formed by resistance spot welding under a condition of a smaller amount of resistive heating than regular welding when the overlapped body 10 is energized while being sandwiched and pressed by the pair of electrodes 3a and 3b so as to form molten pools at the steel plate interfaces as with regular welding. The resistance spot welding is usually performed by setting the amount of energization and the pressing force according to the material to be welded, but the condition of smaller amount of resistive heating than regular welding means to perform resistance spot welding under a condition in which the amount of energization is set to be smaller or the pressing force is set to be larger than regular welding. It is sufficient that the energization point has a resistance small enough to obtain sufficient branch currents, and the energization point may be an energization point at which the interface is fusion joined or an energization point at which the interface is not fused and is thus in a press contact state.

For example, in the case of an overlapped body composed of a 0.6 mm thick mild steel plate (JSC270F), a 1.6 mm thick high-tensile strength steel plate (JSC980Y) and a 1.6 mm thick high-tensile strength steel plate (JSC980Y), the main welding step is performed by setting the pressing force to 3.43 kN, the current to 6.0 kA and the energization time to 18 cycles (300 ms). However, if energization (main welding) is immediately performed under the above-described conditions in a state in which there is no energization point in the vicinity thereof, the expulsion and surface flash is very highly likely to be generated. To address this, prior to the main welding step, a preliminary welding step is performed in which energization is performed by setting the pressing force to 3.43 kN, the current to 5.0 kA and the energization time to 6 cycles (100 ms), it is thereby possible to form an energization point at the interface between the high-tensile strength steel plates.

In the main welding step, as shown in FIG. 2(d), furthermore, by performing the initial spot welding such that a molten pool 6 is formed under a condition in which a branch current is generated in the energization point 5 or the already-formed molten pool 4, the welding current C is branched (C2, C3) in the same manner as described above. Here, in FIG. 2(d), a branch current indicated by C3 is generated in the steel plate 1a. As the amounts of energization flowing through the interfaces, as in FIG. 2(c), the amount of energization at the interface 2a is C1+C2, but the amount of energization at the interface 2b is C1 only, and having the largest contact resistance) in a state in which three steel plates were overlapped.

TABLE 1

| Test No. | Preliminary welding step | | | | Main welding step | | | | Proper current range (kA) |
|---|---|---|---|---|---|---|---|---|---|
| | Pressing force (kN) | Current (kA) | Energization time (cycle) | Retention time (cycle) | Interval of spot positions (mm) | Pressing force (kN) | Energization time (cycle) | Retention time (cycle) | |
| 1 | 3.43 | 7.8 | 20 | 10 | 20 | 3.43 | 20 | 10 | ○ |
| 2 | 3.43 | 7.8 | 20 | 10 | 25 | 3.43 | 20 | 10 | ○ |
| 3 | 3.43 | 7.8 | 20 | 10 | 30 | 3.43 | 20 | 10 | ○ |
| 4 | — | — | — | — | — | 3.43 | 20 | 10 | x |
| 5 | 3.43 | 7.8 | 20 | 10 | 35 | 3.43 | 20 | 10 | x |

Note:
1 cycle = 1/60 second thus the interface 2a has a larger amount of energization than the interface 2b. Accordingly, the formation of a molten pool at the steel plate interface 2b where resistive heating is large can be delayed without impeding the formation of a molten pool at the steel plate interface 2a where resistive heating is small, and thus it is possible to form the molten pool 6 having a sufficiently large size at the steel plate interface 2a where resistive heating is small and the steel plate interface 2b where resistive heating is large.

It is preferable that the molten pool 6 is formed at a position at a horizontal distance W2 of 30 mm or less from the molten pool 4 (the distance between the center of the molten pool 4 and the center of the weld portion 6). Furthermore, spot welding may be repeatedly performed at positions close to the weld portions 4 and 6 that have already been formed so as to perform spot welding consecutively at a plurality of spots. For example, the automotive structural member shown in FIG. 4 can be produced by repeating spot welding in an area within 30 mm from the molten pools 4 and 6 that were formed earlier.

Figure 3:
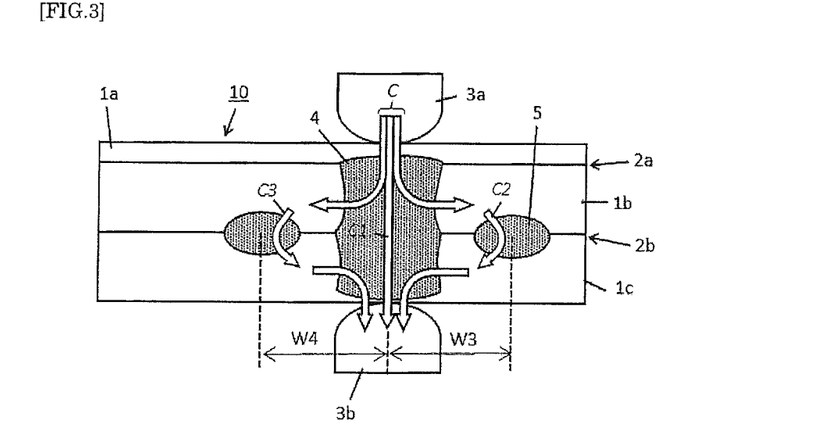
FIG. 3 is a conceptual diagram showing another example of a resistance spot welding method according to the present invention.

It is also possible to, as shown in FIG. 3, form a molten pool 4 near two or more energization points 5 by performing main welding under a condition in which a branch current is generated. At this time, it is preferable to set horizontal distances W3 and W4 from the energization points to be 30 mm or less. A part or all of the energization points may be made as another weld portion (not shown).

Example 1

In order to verify the effects of the present invention, spot welding was performed on one JAC270D steel plate (thickness: 0.7 mm, tensile strength: 270 MPa) and two JSC590DP steel plates (thickness: 2.0 mm, tensile strength: 590 MPa) under conditions shown in Table 1 (tests Nos. 1 to 5). In each example, main welding was performed at a current value of 4.0 kA or more with an increment of 0.25 kA until the expulsion and surface flash was generated, so as to investigate the minimum current value at which all molten pools formed at each interface had a diameter of 4√t (t=0.7 mm and 2.0 mm) or more and the maximum current value at which the expulsion and surface flash was not generated. The results are shown in Table 1, with a circle (○) indicating that the difference between the maximum current value and the minimum current value was 1.0 kA or more, and a cross (x) indicating that the difference between the maximum current value and the minimum current value was less than 1.0 kA. In the examples in which preliminary welding was carried out, an energization point was formed at the interface between two JSC590DP steel plates (the steel plate interface As shown in Table 1, in tests Nos. 1 to 3 in which preliminary welding was carried out to form an energization point in advance and thereafter main welding was carried out, a branch current was generated at the energization point during main welding, and thus a proper current range of 1.0 kA or more was attained. It can be seen from this that by using these conditions, it is possible to make it difficult to generate the expulsion and surface flash at the steel plate interface where resistive heating is large and easily form a molten pool having a sufficiently large size at the steel plate interface where resistive heating is small.

In test No. 4 in which main welding was carried out without carrying out preliminary welding, the proper current range was small. In test No. 5, although preliminary welding was carried out, the position at which the molten pool was formed by main welding was too far from the energization point, and thus a branch current was not generated, as a result of which the proper current range was as small as less than 1.0 kA. Accordingly, if a molten pool having a sufficiently large size is attempted to be formed at the steel plate interface where resistive heating is small by using these conditions, the expulsion and surface flash will be easily generated at the steel plate interface where resistive heating is large, which makes it difficult to perform management in the actual operation.

Example 2

Next, spot welding was performed on one JAC270D steel plate (thickness: 0.7 mm, tensile strength: 270 MPa) and two high-tensile strength steel plates of 1180 MPa grade (thickness: 1.6 mm, tensile strength: 1180 MPa) under various conditions (tests Nos. 6 to 8). In each example, main welding was performed at a current value of 4.0 kA or more with an increment of 0.25 kA until the expulsion and surface flash was generated, so as to investigate the minimum current value at which all molten pools formed at each interface had a diameter of 4√t (t=0.7 mm and 1.6 mm) or more and the maximum current value at which the expulsion and surface flash was not generated.

(Test No. 6)

Main welding was carried out, without carrying out preliminary welding, under the following conditions so as to form a molten pool:
Pressing force: 3.43 kN;
Current: 4.0 kA or more (with an increment of 0.25 kA);
Energization time: 20 cycles; and
Retention time: 10 cycles.

In test No. 6, the minimum current value was 6.0 kA, the maximum current value was about 6.8 kA, and the proper current range was about 0.8 kA.

(Test No. 7)

Preliminary welding was carried out in a state in which three steel plates were overlapped under the following conditions so as to form an energization point at the interface between two high-tensile strength steel plates of 1180 MPa grade (the steel plate interface having the largest contact resistance):

Pressing force: 3.43 kN;
Current: 5.0 kA;
Energization time: 20 cycles; and
Retention time: 10 cycles.

After that, main welding was carried out under the same conditions as those used in test No. 6 so as to form a molten pool at a position corresponding to a horizontal direction from the energization point of 15 mm. The conditions for main welding were the same as those used in test No. 6.

In test No. 7, the minimum current value was 6.5 kA, the maximum current value was 8.0 kA, and the proper current range was increased to 1.5 kA. Even in the case of a plate combination including higher tensile strength steel plates, by performing preliminary welding prior to main welding so as to form an energization point and then performing the initial spot welding under a condition in which a branch current is generated in the formed energization point, it is possible to make it difficult to generate the expulsion and surface flash at the steel plate interface where resistive heating is large and easily form a molten pool having a sufficiently large size at the steel plate interface where resistive heating is small.

(Test No. 8)

Preliminary welding was carried out in a state in which three steel plates were overlapped under the following conditions so as to form an energization point:

Pressing force: 3.43 kN;
Current: 5.0 kA;
Energization time: 20 cycles; and
Retention time: 10 cycles.

After that, main welding was carried out under the following conditions so as to form a first molten pool at a position corresponding to a horizontal distance from the energization point of 15 mm:

Pressing force: 3.43 kN;
Current: 7.5 kA;
Energization time: 20 cycles; and
Retention time: 10 cycles.

After that, furthermore, main welding was carried out under the following conditions so as to form a second molten pool at a position corresponding to a horizontal distance from the first molten pool of 15 mm:

Pressing force: 3.43 kN;
Current: 4.0 kA or more (with an increment of 0.25 kA);
Energization time: 20 cycles; and
Retention time: 10 cycles.

In test No. 8, the minimum current value was 7.0 kA, the maximum current value was about 8.8 kA, and the proper current range was about 1.8 kA. In this way, by performing spot welding under a condition in which a branch current is generated not only in the energization point but also in the molten pool that has already been formed, it is possible to make it difficult to generate the expulsion and surface flash at the steel plate interface where resistive heating is large and easily form a molten pool having a sufficiently large size at the steel plate interface where resistive heating is small.

INDUSTRIAL APPLICABILITY

According to the present invention, even when spot welding is performed on an overlapped body that is composed of three or more steel plates and in which at least one steel plate interface has a contact resistance different from that of another steel plate interface, it is possible to make it difficult to generate the expulsion and surface flash at the steel plate interface where resistive heating is large and easily form a molten pool having a sufficiently large size at the steel plate interface where resistive heating is small. Accordingly, the present invention is optimal in spot welding for producing, for example, a plate combination or the like in which one mild steel plate and two high-tensile strength steel plates are overlapped, in particular, an automotive structural member.

DESCRIPTION OF REFERENCE SIGNS 1a, 1b, 1c Steel plate
2a, 2b Steel plate interface
3a, 3b Electrode
4, 4a, 4b Molten pool
5 Energization point
6 Molten pool
10 Overlapped body
20 Pillar
21 Overlapped body
22 Flange
23 Weld portion
C Current
C1, C2, C3 Current (branch current)

The invention claimed is:

1. A resistance spot welding method in which in an overlapped body that includes three or more steel plates and in which at least one steel plate interface has a contact resistance larger than a contact resistance of another steel plate interface, a first molten pool is formed at the steel plate interfaces so as to join the steel plates, the method comprising:

a preliminary welding step of forming an energization point at the steel plate interface having the larger contact resistance; and a main welding step of performing initial spot welding under a first condition in which a first branch current is generated in the energization point, wherein the initial spot welding is performed such that the first molten pool is formed at a position at a horizontal distance of 30 mm or less from the energization point; and wherein in the preliminary welding step, the energization point is formed at the steel plate interface having the larger contact resistance by energizing the overlapped body while sandwiching and pressing the overlapped body by a pair of electrodes.

2. The resistance spot welding method according to claim 1, wherein in the main welding step, spot welding is further performed repeatedly under a second condition in which a second branch current is generated in the energization point or the first molten pool.

3. The resistance spot welding method according to claim 1, wherein in the main welding step, further spot welding is performed repeatedly such that a second molten pool is formed at a second position at a second horizontal distance of 30 mm or less from the energization point or the first molten pool.

4. The resistance spot welding method according to claim 1, wherein the overlapped body consists of one mild steel plate and two high-tensile strength steel plates.

* * * * *